Jan. 4, 1949.  W. C. HUEBNER  2,458,269
REPRODUCING CAMERA
Filed Oct. 8, 1945  3 Sheets-Sheet 1

INVENTOR
William C. Huebner,
BY
ATTORNEYS

Jan. 4, 1949. W. C. HUEBNER 2,458,269
REPRODUCING CAMERA
Filed Oct. 8, 1945 3 Sheets-Sheet 2
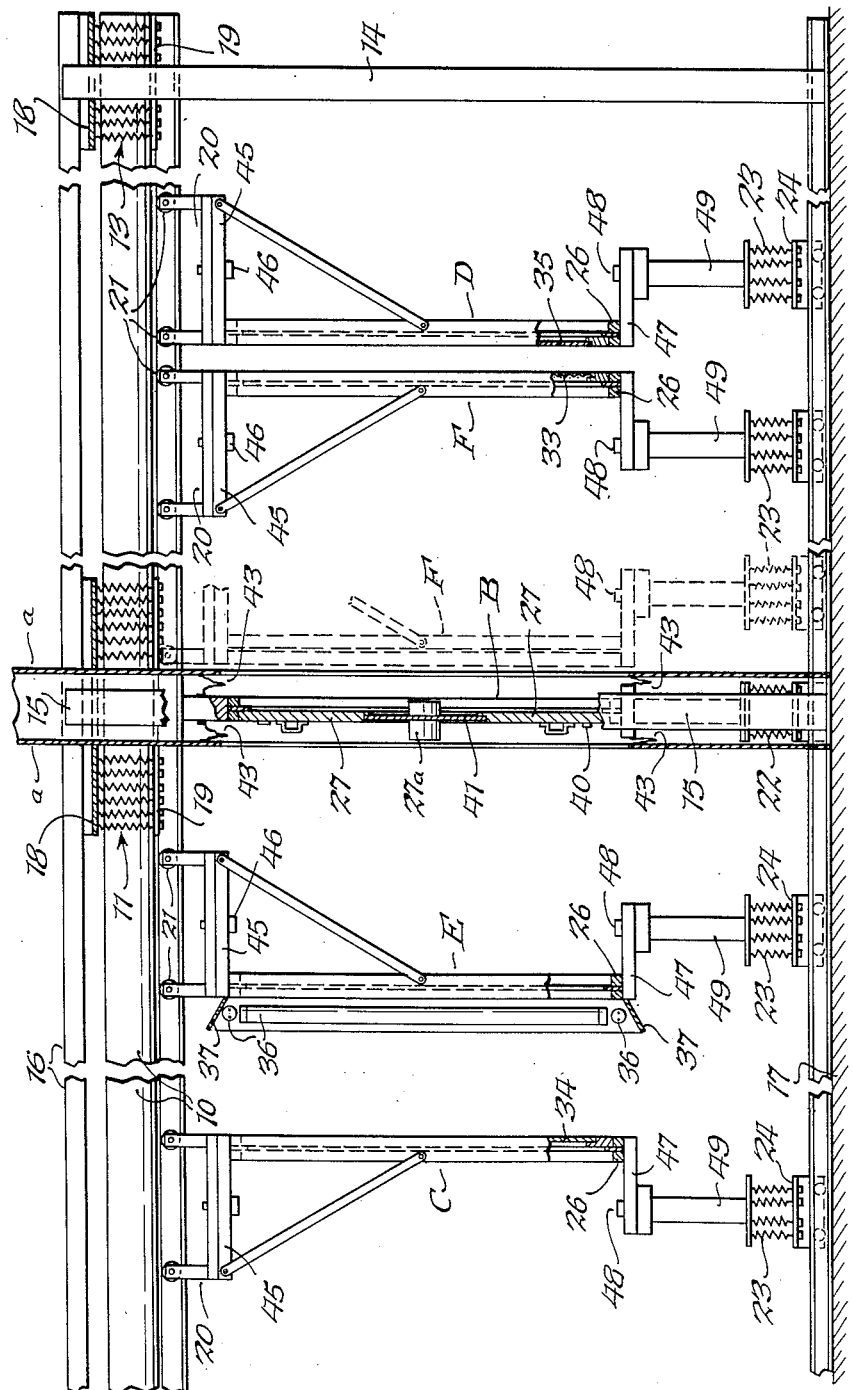
Fig. 3.
INVENTOR
William C. Huebner,
BY
ATTORNEYS Jan. 4, 1949. W. C. HUEBNER 2,458,269
REPRODUCING CAMERA
Filed Oct. 8, 1945 3 Sheets-Sheet 3

INVENTOR
William C. Huebner,
BY Parker, Puschnow & Farmer
ATTORNEYS

Patented Jan. 4, 1949

2,458,269

UNITED STATES PATENT OFFICE 2,458,269

REPRODUCING CAMERA

William C. Huebner, New York, N. Y.

Application October 8, 1945, Serial No. 620,883

2 Claims. (Cl. 88—24)

This invention relates to camera structures and particularly to a reproduction and image-reversing camera structure whereby color and other copy or subjects of various kinds can be reproduced expeditiously and with the maximum accuracy, sharpness and quality of the images, and which has great range capacity for attaining exact focus and producing copy images in all sizes, from minute reductions to enlargements of great size. In certain of its aspects, as will hereinafter appear, the invention is in the nature of an improvement on the invention of my copending application #513,012, filed Dec. 6, 1943, now Patent No. 2,406,770, issued September 3, 1946, and utilizes certain features of the invention of said application, whereby the benefits of said invention are realized in a camera structure having an increased range of usefulness and, furthermore, adapted for accomplishing new results not disclosed in said application.

One object of the invention is to provide a camera structure which, while retaining the advantages and improved results incident to said prior invention, increases the range of usefulness thereof, and which is also adapted for producing entirely different improved results.

Another object of the invention is to provide a straight-line camera by which the photographed image of the copy or subject is produced on the sensitized image-receiving element or surface in reversed position relative to that produced by previous cameras.

Other objects are to provide a novel camera construction in which the elements are arranged and cooperate to enable accurate and high quality reproductions of subjects with much greater range of reduction and enlargement than has heretofore been possible; in which the cooperative elements or parts are so constructed or arranged as to ease and facilitate their operation to accomplish such results; in which carriers or supports for the camera lens, the copy and the sensitized surface, photographic screens or other essential elements of the camera are replicas of one or another, whereby holders for the lens, copy, sensitized surface or other elements can be interchangeably mounted on the carriers in various different relations to enable quick and easy production of different kinds of work, and whereby the cost of production of the camera is greatly reduced; to provide a camera structure including a partition separating two rooms or compartments, a middle carrier for either a lens or a translucent image screen or element arranged substantially in the plane of the partition, end carriers, one for the copy and another for the sensitized surface, located at opposite sides of the partition, and also preferably intermediate carriers, one for a light source, or transparency, and another for a half tone or other photographic screen, each arranged between the middle carrier and one end carrier with said several carriers arranged to support their respective elements in planes perpendicular to the axis of the lens, and with said end and intermediate carriers adjustable toward and from each other and the middle carrier, for enabling different kinds of work or reproductions in sizes from minimum reductions to maximum enlargements of the copy.

Further objects and advantages of the invention will appear from the following specification of the preferred embodiment of the invention shown in the accompanying drawings, and the novel features of the invention are set forth in the appended claims.

In said drawings:

Fig. 3 is a fragmentary, longitudinal, sectional elevation similar to Fig. 1, but showing the camera elements and their carriers arranged for ordinary reproduction of the copy on the sensitized surface.

Figure 1:
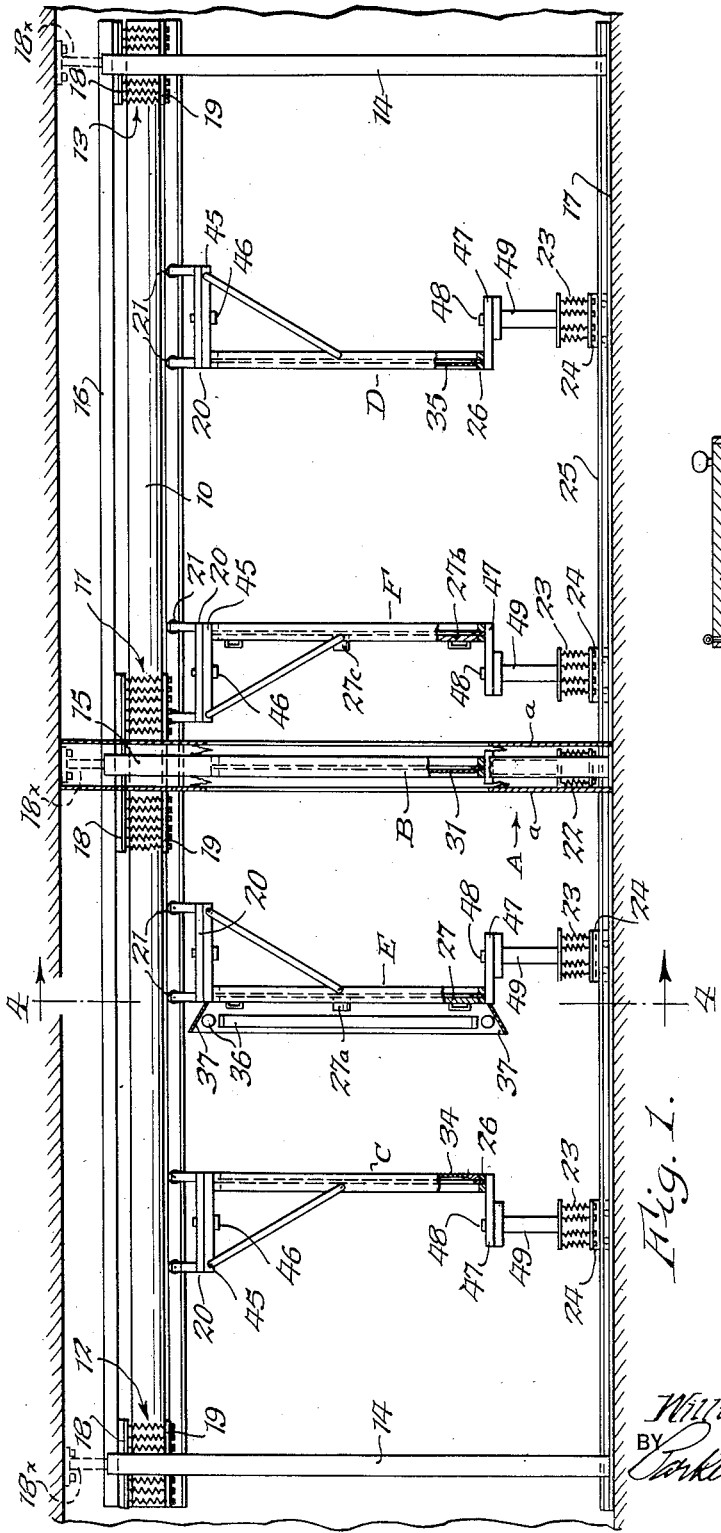
Fig. 1 is a longitudinal, sectional elevation of the camera structure showing a straight-line arrangement of the camera elements suitable for reversing the image of the copy produced on a sensitized surface.

In its preferred construction illustrated in the drawings, the camera structure comprises a transverse, vertical partition A dividing a room or space into separate compartments or rooms, either or both of which may be darkened or illuminated either simultaneously or separately according to requirements; a middle carrier B for a lens, or other camera element, arranged parallel with the plane of the partition and preferably between spaced panels or walls a forming the partition; end carriers C and D at opposite sides of the partition for respectively supporting a copy or subject of any character to be reproduced, and a film, plate or other sensitized surface on which the photographic image is made; and also preferably two intermediate carriers E and F disposed, one at one side of the partition between the middle carrier and the copy carrier C, and the second at the opposite side of the partition between the middle carrier and the sensitized surface carrier D. These several carriers are constructed and arranged to support their respective camera elements in planes parallel with the plane of the partition and perpendicular to the axis of the lens, and said end and intermediate carriers are mounted so as to be adjustable relatively toward and from each other and the middle carrier in the line of the lens axis while being maintained in parallelism with one another and perpendicular to said axis for proper focusing purposes and for making reduced or enlarged reproductions of the copy, as later explained.

In practice, where fine quality reproductions are required, particularly in projecting images over spaces of considerable extent between the copy, the lens and the sensitized surface, it is important to resiliently support the carriers for the several camera elements so that the elements will be maintained always, in their various relative adjustments, perpendicular to the axis of the lens and with their centers coincident with said axis, regardless of any swaying, weaving or vibration of the building in which the structure is installed or of the supporting structure of the camera itself. Such vibrations or motion may result from the installation of the camera structure in buildings such, for instance as printing establishments, which frequently are subject to vibration or motion due to the operation of presses or other internal or outside causes; or the vibration or motion may result from operation or adjustments of the camera parts. Whatever may be their origin, such vibrations or motion would militate against sharp, high quality images.

Therefore, the several carriers B, C, D, E and F are supported or mounted substantially as disclosed in said copending application, to enable them to have corresponding resilience in the several planes which they occupy in any adjustment of the adjustable carriers. Preferably, as illustrated in the drawings, an overhead, rigid guide or rail 10 is provided which extends through and to opposite sides of the partition A, parallel with the axis of the lens, and the several carriers B—F are suspended from said guide or rail 10, which is supported for bodily resilience or yielding motion in the vertical plane of the axis of the camera lens from a suitable rigid supporting frame by spaced spring supports 11, 12 and 13. The supporting frame may comprise end and intermediate, upright open frames 14 and 15, rising from and rigid with the floor 17 of the room or other suitable stationary horizontal foundation and connected by a top frame bar 16, or may be a supporting structure of any other suitable form. As shown, the spring supports 11—13 are disposed at the middle and opposite end portions of the guide or rail 10 with the middle support adjacent the stationary partition, and the end supports at the opposite end portions of the guide rail, thus providing a three point spring support for the guide or rail, each of which spring supports may consist of a cluster of several coil springs connected at their upper ends to a plate 18 fixed on the supporting frame and a plate 19 rigid with and projecting from the guide or rail 10.

Figure 4:
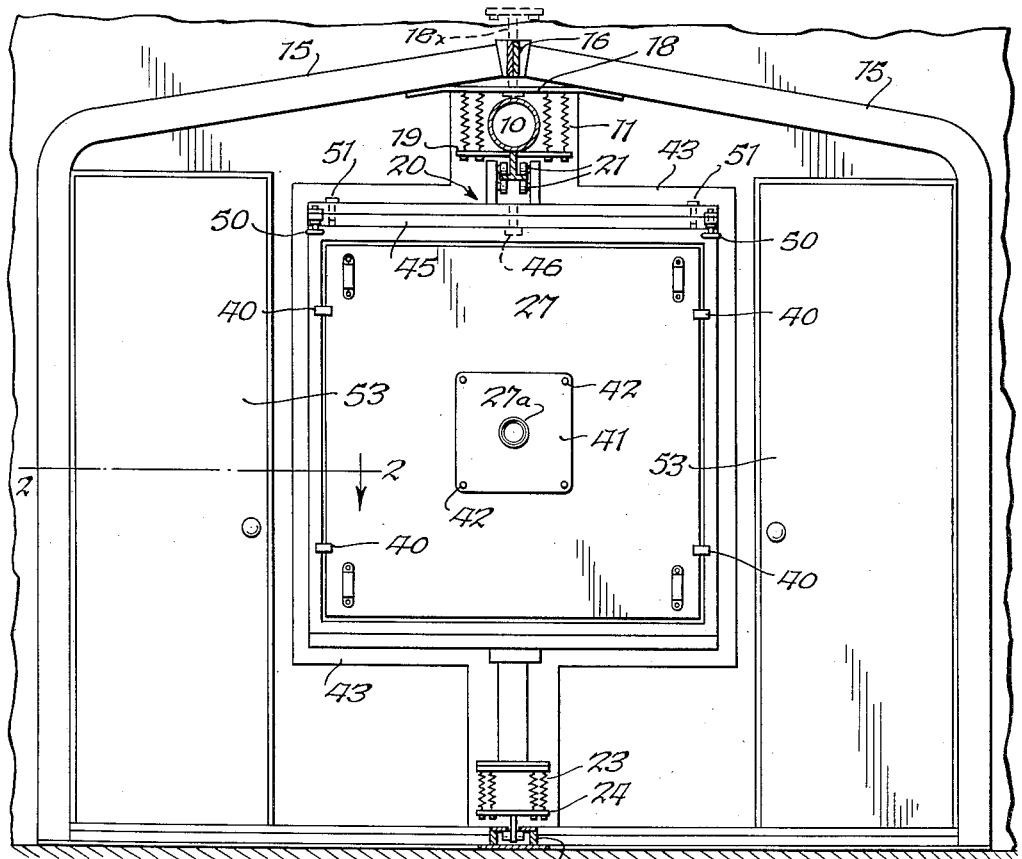
Fig. 4 is a transverse, sectional elevation, enlarged, of the camera structure on line 4—4, Fig. 1.

The several carriers B, C, D, E and F being suspended from the guide 10, are thus capable of corresponding or equal vertical resilience with the guide. The middle carrier B, which is not adjustable but remains in the fixed partition, may be rigidly attached at its upper end to the guide 10 in any suitable manner, and is thus retained vertical, but is permitted vertical resilience within and free of the partition. The other or adjustable carriers C, D, E and F, are also suspended from the guide or rail 10, but for enabling adjustment of these carriers relatively toward and from each other and the middle carrier B in the path of the axis of the photographic lens, each of these carriers includes a carriage 20 mounted as by rollers 21 to travel on the guide 10 longitudinally thereof. Each of the several carriers is connected at its lower end to tensioning means which exerts a vertical downward tension on the carrier in such a way, that while permitting vertical resilience of the carrier with the overhead guide, opposes any swaying or motion of the carrier laterally, either in its vertical plane or transversely of said plane, whereby each carrier is resiliently maintained in the vertical plane thereof, with the center of the carrier coincident with the axis of the lens, notwithstanding any weaving, vibration or motion of the camera supporting structure or building in which it is installed. The tensioning means 22 for the middle carrier may consist of coil springs attached at their upper ends to the lower end of the carrier centrally thereof and suitably anchored at their lower ends to the supporting foundation for the camera structure, but since the other carriers C, D, E and F are adjustable along the guide, the tensioning springs or means 23 for each of these adjustable carriers are connected at their upper ends to the lower end of the carrier, centrally thereof, and are attached at their lower ends to a traveller 24 arranged to travel along and be maintained in connection with a suitable stationary base rail 25 fixed to the floor or supporting foundation and extending parallel with and preferably in the vertical plane of the overhead guide or rail 10. This base rail, as shown in Fig. 4 may be hollow with a longitudinally slotted top, and each traveller 24 may have a hanger extending through the rail slot and carrying rollers bearing upwardly against the slotted top of the rail, whereby the tensioning device for each adjustable carrier may travel along the base rail in the adjustments of the carrier so that the travelling tension means 23 will always exert a vertical, downward tension centrally on the carrier in any adjustment thereof.

The above described supporting, guide and tensioning means providing vertical resilience for the carriers in the planes thereof and exerting downward, resilient tension on the carriers, are substantially similar to the means disclosed for these purposes in said copending application, to which reference may be had for a more detailed disclosure of these means.

Figure 5:
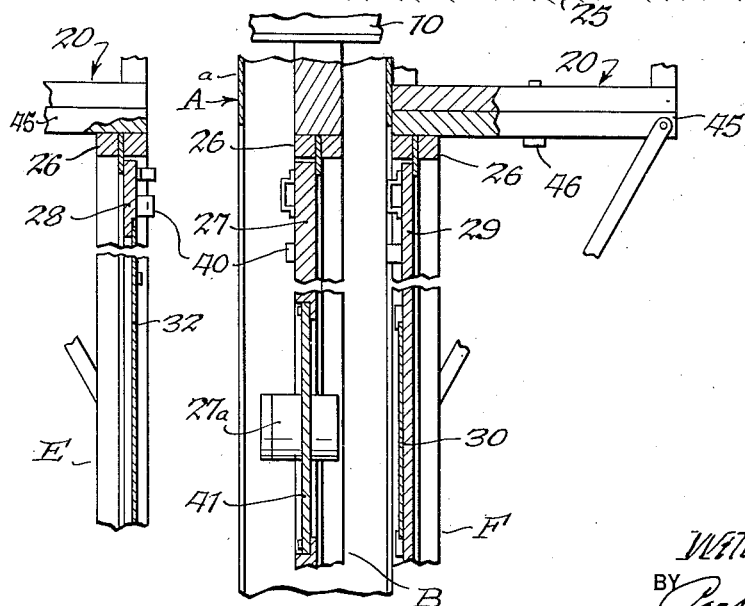
Fig. 5 is a fragmentary, longitudinal, sectional elevation showing the sort of adjustment or arrangement of the lens, copy and sensitized surface carriers used for making a reduced image of minimum size of the copy.

Preferably, as shown, each of the carriers, B, C, D, E and F is in the form of or comprises a rectangular frame 26 with a large, central opening therethrough and adapted to removably support over or in the frame opening, one or another camera element, such as a lens board or holder 27, Fig. 5, carrying a camera lens 27a, or a holder 28 for the copy to be reproduced, or a holder 29 for the sensitized surface 30, or a translucent panel or other element, and these several frames are of like dimensions or are replicas of one another, to thus enable one or another of the camera elements to be interchangeably supported in one or another of the carriers and thereby adapt the camera for different uses. For instance, as shown in Figs. 3 and 5, the lens holder 27 carrying the lens 27a is adapted to be supported in the frame of the middle carrier B, or the lens holder with the lens may be removed from this middle frame B and replaced by a translucent glass plate or panel, indicated at 31, Fig. 1, having a fine ground surface or screen for a projected image of the copy, and the removed lens holder 27 with the lens then supported in the intermediate carrier E, as shown in Fig. 1. The lens holder is thus adapted to be interchanged with the translucent panel 31 on the middle carrier B, or with a transparency or other camera element on the intermediate carrier E, such a transparency being indicated at 32, Fig. 5. Similarly, the other intermediate carrier F is adapted to interchangeably support the lens holder or a second like lens holder 27b with lens 27c as shown in Fig. 1, or a half tone or other photographic screen, which is indicated at 33, Fig. 3.

Fig. 1 illustrates, for example, an arrangement of the parts in which a lens holder with a lens is mounted in each of the two intermediate carriers E and F, and the translucent panel or plate 31 is mounted in the middle frame B, the camera being thus adapted, by mounting a copy or subject, indicated at 34, on one end carrier C and a sensitized surface, indicated at 35 on the other end carrier D, for reversing the image of the copy on the sensitized surface. In this arrangement, the lens 27a on the intermediate carrier E projects an image of the copy on the ground surface of the translucent panel 31 in the middle carrier and the second lens 27c on the other intermediate carrier F projects this image onto the sensitized surface, the image on the sensitized surface thus being reversed with respect to the image on the translucent panel 31. The intermediate and end carriers being adjustable, enables the proper focusing of the lenses with reproduction of the copy in any required sizes, either reduced or enlarged.

For ordinary reproductions of the copy, the camera elements may be arranged as shown in Fig. 3, with the lens holder 27 and lens supported in the middle carrier B, the copy 34 supported on one end carrier C and the sensitized surface 35 supported on the other end carrier D. With either the Fig. 1 or Fig. 3 arrangement, the copy may be illuminated by suitable light tubes 36 and reflectors 37, or other source of light supported on the intermediate carrier E around its frame opening, and in this Fig. 3 arrangement, this carrier frame is left open and unobstructed, so that the lens projects the image of the copy onto the sensitized surface 35, and if a half tone or other photographic screen is necessary in order to obtain a required character of reproduction on the sensitized surface, a screen of the appropriate type, indicated at 33, Fig. 3, may be supported in the frame of the second intermediate carrier F.

If reproductions are to be made from a transparency, the transparency, indicated at 32, Fig. 5, is placed in the frame of the carrier E and a suitable light-reflecting sheet or surface is provided on the copy carrier C to reflect the light from the light source 36 through the transparency to the lens 27a on the middle carrier B.

The holders for the lens and other camera elements, which as explained, are removably and interchangeably supported on the carriers, may be releasably held in place on the open frames of the carriers by any usual or suitable holding devices, indicated conventionally at 40, Figs. 3–5, and the holder for each element may be in the form of a rectangular, open frame or of other form adapted for mounting the particular element, depending upon the nature thereof, and each holder may be furnished with fastening means of any usual or suitable kind adapted to secure the element on the holder. In the case of the lens holder, for example, the lens is mounted in an adaptor 41, Figs. 4 and 5, removably retained in an opening in the lens holder 27, as by suitable fasteners 42, thus enabling interchangeability of lenses of different kinds or sizes.

The several adjustable carriers C—F may be adjusted longitudinally on their supporting guide by manual or power-operated means, and may be stationarily held in their various adjustments by appropriate means. Means suitable for these purposes are known in the art, and since the present invention is not concerned with the particular character or construction of such means, it is considered unnecessary to herein illustrate or describe them.

Light-sealing means may be provided, as indicated at 43, Figs. 3 and 4, which are adapted to prevent the passage of light through the opening of the partition around or through the middle carrier B, without interfering with the vertical resilience of the carrier relatively to the partition.

Each of the other carriers C—F, as shown, is mounted on its carriage 20, so as to enable the position of the carrier to be reversed on the carriage in order to place the open carrier frame to face either toward or away from the middle carrier or the next adjustable carrier. For this purpose, as shown, each carrier is provided with a top part 45 which projects horizontally from the upper end of the vertical, open carrier frame, at one side thereof, and is pivotally connected, as by a central pivot 46 to the horizontal bottom part of its carriage 20, and at its lower end the carrier frame has an offset, horizontal part or member 47 pivoted at 48 to the bottom portion 49 of the carrier, to which the tensioning means for the carrier is connected. These pivots 46 and 48 are in vertical alinement offset horizontally from the vertical plane of the carrier frame so that by turning the frame about the pivots, the frame can be placed nearer to or farther from the middle carrier or adjacent adjustable carrier. For example, as shown in full lines in Fig. 3, the intermediate carrier frame F is turned to stand close to the frame of the end carrier D, so as thereby to enable a photographic screen on the carrier F to be placed in the required close proximity to the sensitized surface on the carrier D; and by broken lines in this figure and in Fig. 5, this intermediate carrier is shown in its reversed position, thus adapting its adjustment face to face with and close to the middle carrier, in which position it is adapted, for instance, to support a sensitized surface in the nearest possible proximity to the lens to adapt the camera for making reproductions of minimum size on the sensitized surface. Each reversible frame may be releasably locked stationarily in either of its two positions by suitable fasteners, as screw bolts 50, Fig. 4, on one relatively movable part, and adapted to be screwed into holes in the other part. These fasteners may be supplemented by dowel pins 51 engageable in registering holes in the relatively movable parts to ensure accurate positioning of the reversible frame in both of its two positions. This reversibility of the carriers combined with their adjustment on their supporting guide relatively toward and from each other and the middle carrier, enables a great diversity of relative positions and range of adjustment of the carriers and adapts the camera for a great variety of different uses or purposes and suitable for making reproduction ranging widely in size from the minimum reduction to the maximum enlargement of the copy. Nevertheless, the carriages for the adjustable carriers can be made of substantial construction and adequate length and the carriers of sturdy formation adapted to ensure that they will be always maintained in vertical planes or perpendicular to the axis of the lens or line of longitudinal adjustment of the carriers.

Figure 2:
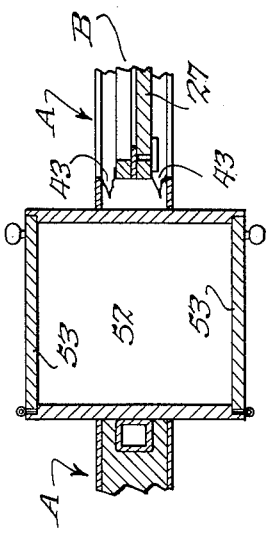
Fig. 2 is a fragmentary, horizontal section on an enlarged scale on line 2—2, Fig. 4, showing one of the light traps for permitting passage of the operator from one or another of the rooms separated by the partition.

The partition A, see Fig. 2, is provided with suitable light traps 52, preferably one at each side of the camera, to enable the operator to pass through the partition from one to the other of the rooms separated by the partition A, as may be necessary for adjusting the carriers, placing the camera elements thereon or interchanging them, or for other operations. Each light trap as shown, is formed by two doors 53, spaced sufficiently to enclose a space or compartment between them of ample size for the operator to enter through one door and close it before opening the other door.

The overhead rigid guide or rail 10 has been herein described as spring-suspended from a suitable supporting frame rigid with the room floor or other stationary foundation. An alternative way of spring-suspending the overhead guide 10, when the camera is installed in a building having a ceiling structure of adequate strength, is to suitably attach the top plates 18 for the suspension springs 11, 12 and 13 to such ceiling structure, as by appropriate hangers 18x fixed to the ceiling structure, as indicated by broken lines in Figs. 1 and 4.

I claim as my invention:

1. Reproduction photographic apparatus including an overhead guide, a lower guide, upper and lower carriages adjustable along said guides, the lower carriages including tensioning means, cooperating lens, copy and sensitized surface carrying frames located between said upper and lower carriages, a pivot on each of said upper carriages for rotatably supporting one of said frames for rotational movement through one hundred and eighty degrees while under tension from the tensioning means associated with said carriages, whereby to enable said frames to be rotated face-to-face, face-to-back and back-to-back positions so that copy, lens and sensitized surfaces may be supported in positions which will enable extreme reduction and enlargement of images.

2. Reproduction photographic apparatus including an overhead, spring-suspended, monorail guide, a lower guide, upper and lower carriages adjustable along said guides, the lower carriages including tensioning means, cooperating lens, copy and sensitized surface carrying frames located between said upper and lower carriages, pivots on said upper and lower carriages for rotatably supporting each of said frames for rotational movement through one hundred and eighty degrees while under tension from the tensioning means associated with said lower carriages, whereby to enable said frames to be rotated face-to-face, face-to-back and back-to-back positions so that copy, lens and sensitized surfaces may be supported in positions which will enable extreme reduction and enlargement of images.

WILLIAM C. HUEBNER.

REFERENCES CITED

The following references are of record in the file of this patent:

UNITED STATES PATENTS

| Number | Name | Date |
|---|---|---|
| 1,035,977 | Lamb | Aug. 20, 1912 |
| 1,629,974 | Russo | May 24, 1927 |
| 2,289,121 | Huebner | July 7, 1942 |
| 2,391,430 | Macek | Dec. 25, 1945 |
| 2,406,770 | Huebner | Sept. 3, 1946 |

FOREIGN PATENTS

| Number | Country | Date |
|---|---|---|
| 219,051 | Great Britain | July 24, 1924 |